Dec. 1, 1970  C. C. ADAMS  3,543,531
FREEZE REFINING APPARATUS
Filed May 8, 1967

Clyde C. Adams
INVENTOR

BY
Pravel, Wilson & Matthews
ATTORNEYS

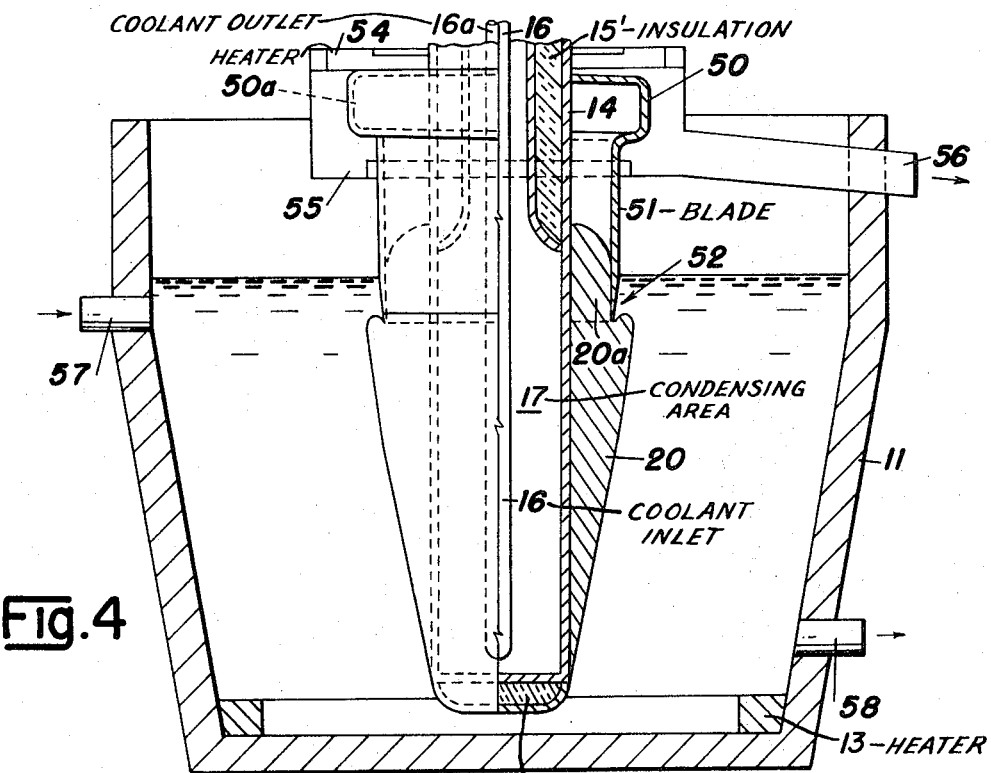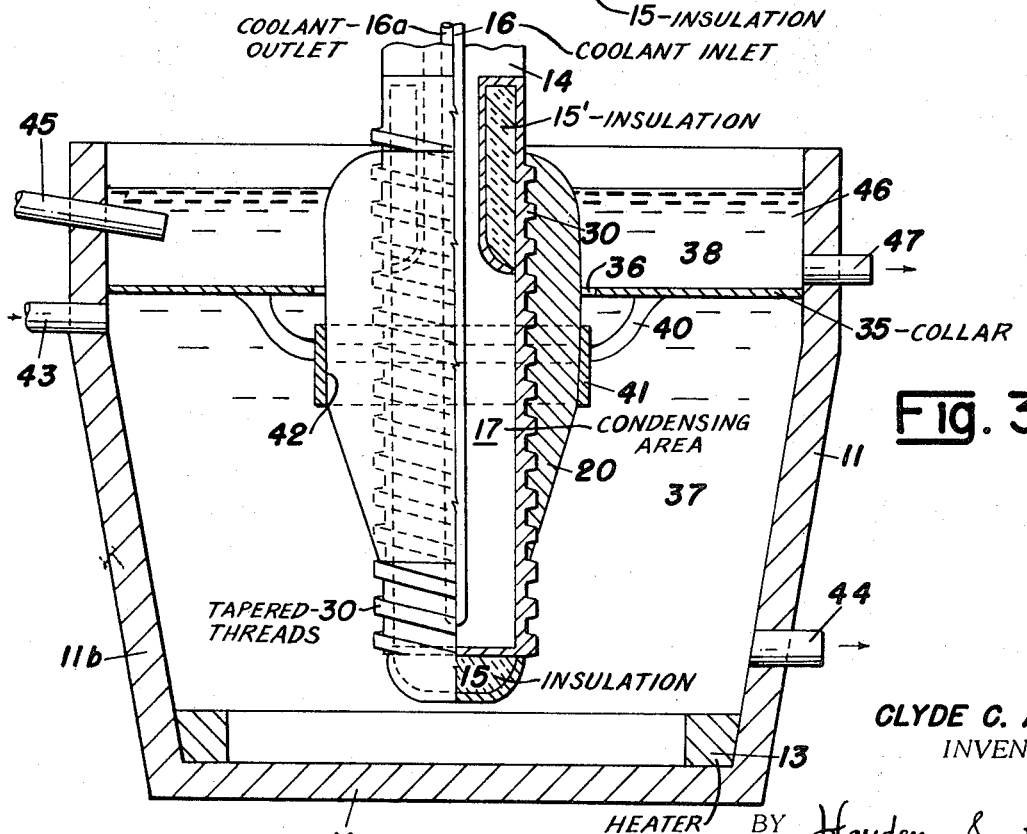

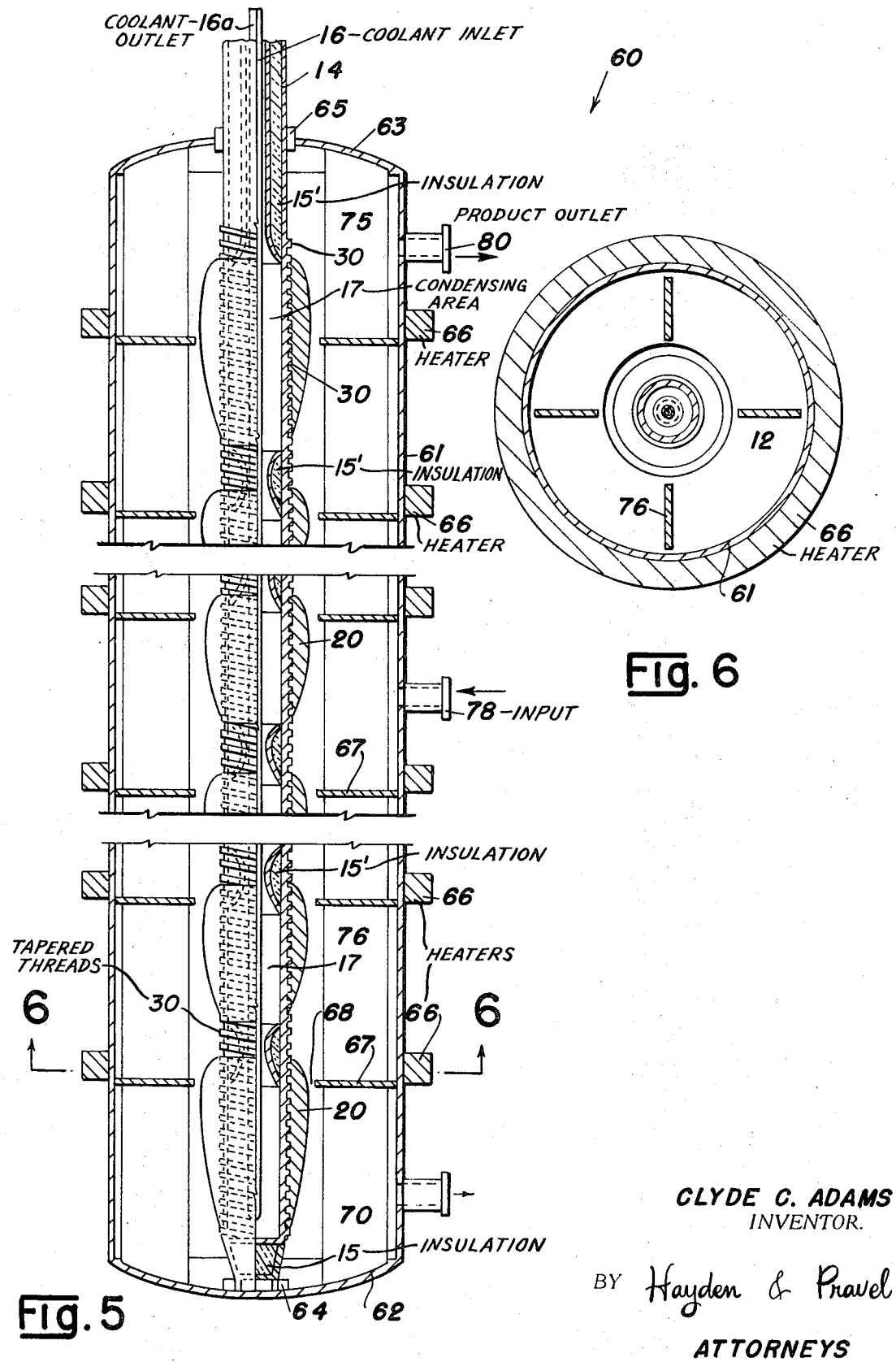

United States Patent Office 3,543,531
Patented Dec. 1, 1970

3,543,531
FREEZE REFINING APPARATUS
Clyde C. Adams, 3800 Baker Road, Apt. 137,
Baytown, Tex. 77520
Filed May 8, 1967, Ser. No. 636,924
Int. Cl. B01d 9/04
U.S. Cl. 62—124    9 Claims

ABSTRACT OF THE DISCLOSURE

An apparatus for obtaining pure solid materials from a liquid melt containing impure and pure materials and for continuous removal of the pure solid materials utilizing a crucible for receiving the liquid melt with a rotatable hollow cylindrical shaft positioned in the crucible. The hollow shaft is provided with conduit means for circulating coolant therein which thereby causes pure materials with a high melting point to become deposited on the rotating shaft in a pure solid crystal form. The deposited pure solid is then continuously removed from the shaft.

BACKGROUND OF THE INVENTION

This invention relates to the art of freeze refining and more particularly to a new and improved freeze refining apparatus.

Freeze refining involves the controlled cooling of a liquid melt system having at least two constituents, materials, or components. These two materials may be basically classified as pure and impure materials with the pure material having a higher melting point than the impure materials, all of which is well known. Thus, as disclosed in the patent to Aamot No. 3,249,425, a process for freeze refining a metal is disclosed utilizing a liquid melt being positioned in a rotating, horizontally positioned retort.

However, certain problems arise when it is desirable to continuously remove the pure deposited material from the liquid melt. For example, when removing pure deposited material from the melt, it is desirable to eliminate splashing of the melt and a vortex effect due to removal of the solid at the melt-air interface. Thus, at the present time, most of the known processes involve the reduction of batch pure materials.

It is also known that when materials are separated by means of fractional crystallization of a liquid melt into two or more phases having different freezing points, the material having the higher melting point will migrate in the direction of a cooled zone where it will solidify in the form of a scale or layer of solid material. It is also well known that the material having the higher melting point will be pure material such as pure tin, lead, aluminum, or other suitable metals, alloys, or materials relative to the materials in the liquid melt.

SUMMARY

It is an object of the present invention to provide a new and improved freeze refining apparatus.

Yet another object of the present invention is to provide a new and improved freeze refining apparatus which includes a crucible for receiving liquid melt containing pure and impure materials and a vertically positioned rotatable hollow shaft positioned therein and adapted to be cooled to a lower temperature than the liquid melt wherein pure solid materials are deposited on the rotatable shaft.

Still yet another object of the present invention is to provide a new and improved freeze refining apparatus including a crucible for receiving liquid melt containing pure and impure materials, a vertically positioned, cylindrical, rotatable, hollow, cooled shaft for receiving deposits of pure solid material thereon from the liquid melt and a means for continuously removing the pure solid material from the crucible whereby a continuous process of removing pure solid material from the liquid melt is effected.

BRIEF DESCRIPTION OF THE DRAWINGS

FIG. 3 is a view, partly in section, similar to FIG. 2 but including an arrangement of a collar including means for separating the crucible into the upper and lower sections;

FIG. 4 is a view, partly in section, of a crucible containing the liquid melt with the rotatable shaft having cooling means positioned therein and illustrating an embodiment of a means for continuously removing pure solids deposited on the rotatable shaft wherein the means includes a heating means for remelting the solid material after it has been deposited and moved up the rotatable shaft;

FIG. 5 is a sectional view illustrating a plurality of the freeze refining apparatus units mounted or connected in series to effect a continuous purification process running from a lowermost unit to an uppermost unit; and FIG. 6 is a view taken along line 6—6 of FIG. 5 illustrating the relationship of a tube relative to the rotatable internally cooled shaft and a baffle agitator system adjacent thereto.

DESCRIPTION OF THE PREFERRED EMBODIMENTS

In freeze refining process, the term "K" factor is used in terms of a measuring medium. Mathematically, the K factor can be expressed as:

$$K = \frac{\ln\left(\frac{S}{S_1}\right)}{\ln(1-g)}$$

wherein S represents the amount of impurity remaining in the liquid after a fraction $g$ has been frozen, and $S_1$ is the amount of impurity contained in the original melt. The factor K is usually defined as the ratio of the percent impurity in the depositing solid to the percent impurity in the liquid at any given instant. It is to be understood that the freeze refining apparatus of the present invention is amenable to the purification of either solid or liquid phases, depending upon whether the impurity is the higher or lower melting component. In the former case, impurities will become frozen out, and the higher the K factor, the better the separation between the impurities and the pure material. In the latter case, impurities will concentrate in the liquid, and the lower the K factor, the better.

Figure 1:
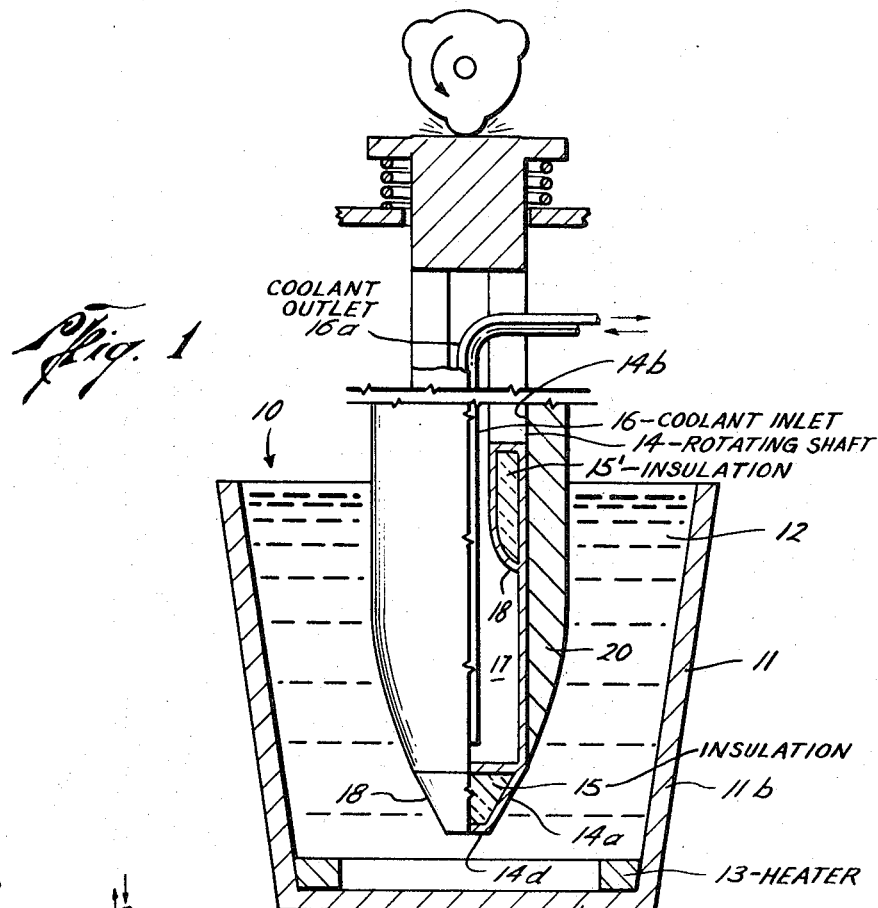
FIG. 1 is a view, partly in section, illustrating a crucible filled with a liquid melt and having a rotatable hollow shaft with cooling means positioned therein.

Attention is directed to FIG. 1 wherein the freeze refining apparatus is generally designated by the numeral 10 and is illustrated as including a crucible or other suitable container 11 adapted to receive a liquid melt 12 for refining thereof. A heating means 13 is illustrated as being positioned adjacent a bottom 11a and side walls 11b of the crucible 11 for insuring that the liquid 12 is maintained in a liquid state. It is to be understood that the heating means employed may vary and may be positioned either externally or internally relative to the crucible.

A shaft 14 is partially immersed in the liquid melt 12 and is mounted with a suitable means for rotation (not shown). The shaft 14 is hollow on the inside thereof and is provided with insulation material 15 and 15' which is illustrated as being positioned adjacent the bottom tapered surface 14a and an upper portion of the shaft 14, respectively. The insulation 15' is illustrated as being positioned inside the shaft 14 and adjacent the inner surface 14b of the cylindrical shaft 14 while insulation 15 is illustrated as being positioned in the cone formed by the tapered surface 14a of the shaft adjacent the end 14d thereof. Positioned in the hollow shaft 14 is a conduit 16 adapted to communicate cooled liquid or the like from a suitable source (not shown) to a section 17 of the shaft 14 which is positioned between insulation 15 and 15'. The insulation 15 and 15' is provided with a suitable sealing means 18 for preventing communication of the coolant positioned in the section 17 of the shaft 14 with the insulation 15 and 15', respectively. It should be noted that the liquid coolant deposited in the section 17 may be removed from the shaft 14 by recirculating same upwardly around the outer surface 16a of the conduit means 16 as desired. When the shaft 14 is rotated, the coolant is then transferred to the section 17 by the conduit 16 and the pure solid material will be deposited on the section 17 thereon in small continuous phases, if the K factor is less than unity as set forth hereinabove. Of course, if the K factor is greater than unity, then the impurities will be deposited on the rotating internally cooled shaft 14 because in that situation the impurities would have a higher melting point than the pure materials in the liquid melt. Thus, in FIG. 1, a pure solid material 20 is illustrated as being positioned around the rotatable internally cooled shaft 14 since the K factor is assumed to be less than unity.

In the freeze refining apparatus 10 of the present invention, when the solid material 20 is deposited on the outer surface of the shaft 14 in the vicinity of the section 17 of said shaft 14, there is built up a thin diffusion film (not shown) between the rotating solid material 20 and the stationary liquid melt 12. Also, when the pure solid materials 20 are deposited on the section 17, a small incremental area immediately adjacent the deposited solid will include a higher concentration of impurities which will be trapped between the diffusion film and the solid 20. Thus, it should be apparent that it is important to permit the impurities trapped therein to diffuse quickly out into the liquid melt 12 and also for the pure materials in the melt to penetrate the diffusion so that they might become deposited with the pure solid material 20. Therefore, the cylindrical, rotatable, internally cooled shaft 14 is rotated at sufficient revolutions per minute to enable this diffusion film thickness to be sheared or cut down, thereby enabling diffusion time to be substantially lowered. This enables the high concentration of impurities trapped between the film and solid 20 to be diffused out into the liquid melt 12 and the pure materials in the liquid melt 12 to penetrate the film and become deposited on the pure solid material 20 or section 17 of the shaft 14.

The solid 20 deposited on the rotatable shaft 14 is adapted to be moved or walked upwardly on the shaft 14 by sharply tapping the shaft at its upper end with a suitable means (not shown) such as a controlled spring weight which transfers an inertial force to the shaft 14 and an oppositely occurring inertial force to the solid 20, thereby enabling the shaft 14 to slip through the pure deposited solid material 20 to cause the solid 20 to move up the shaft 14 to effect a continuous removal of the deposited solid material 20 from the liquid melt 12.

Figure 2:
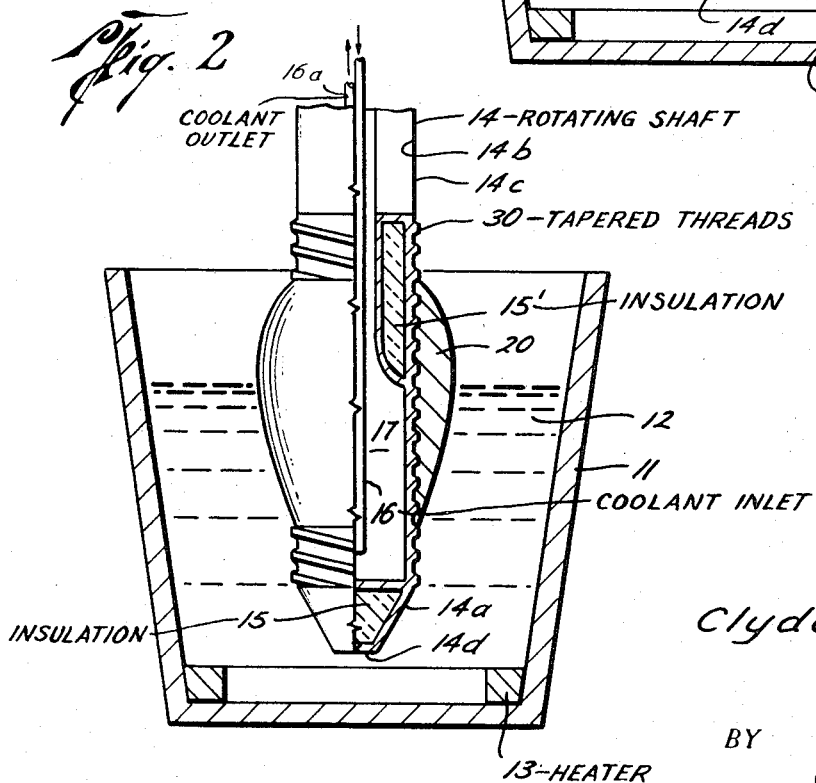
FIG. 2 is a view similar to FIG. 1 wherein the rotatable shaft is provided with external threads on the outer surface thereof.

As illustrated in FIG. 2, an alternative embodiment is shown wherein the rotatable shaft 14 is provided with externally tapered threads 30 on the outer surface 14c thereof for effecting removal of the pure deposited solid material 20 from the liquid melt 12. In this embodiment, the rotatable shaft 14 is quickly accelerated or decelerated which again transfers an inertial force to the solid 20 aided by the drag of the liquid melt 12 to thereby "screw" or "unscrew" the deposited solid material 20 to cause it to move up the rotatable shaft 14.

As illustrated in FIG. 3, another alternative embodiment is illustrated as including an annular collar 35 which is secured to the side walls 11b of the crucible 11 and is positioned parallel with the bottom 11a thereof. The collar 35 is provided with an opening 36 for enabling the deposited solid material 20 to move from a lower section 37 of the crucible 11 to a higher section 38. As the deposited solid material 20 moves up the rotatable shaft in a manner hereinabove described relative to FIG. 2, it reaches the section 38 of the crucible 11. As further illustrated in FIG. 3, the collar 35 has secured therewith a pair of downwardly, arcuately curved attachments 40, each of which is secured on either side of an annular ring 41 which is suspended in the lower section 37 of the crucible 11. Thus, the ring 41 limits the size of the deposited solid material 20 and is effective in helping to move the deposited solid material 20 up the shaft 14 and out of the lower section 37. The inner surface 42 of the annular ring 41 contacts the deposited material 20 and shears off the deposited material 20 which has a larger diameter than the diameter of the inner surface 42 of the annular ring 41. At the same time, the frictional engagement of the pure deposited solid material 20 and the inner surface 42 of the ring 41 provide a drag on the deposited solid material 20 which has the effect of enabling the deposited solid material 20 on the shaft 14 to push up the shaft 14 on the tapered threads 30.

A conduit 43 is provided for enabling communication with the section 37 of the crucible 11 to enable the liquid melt 12 containing pure and impure materials therein to be deposited in section 37. There is also provided a conduit 44 for enabling the liquid melt to be removed from the lower section 37 of the crucible 11. A heating means 45 is illustrated as being in communication with the upper section 38 of the crucible 11 to melt the pure solid deposited material 20 as the deposited solid material 20 is moved up the shaft 14 into the section 38 of the crucible 11. Thus, the liquid 46 in the upper section 38 will be pure liquid material which is adapted to be removed from the upper section 38 by a conduit 47 to a suitable storing means (not shown). It should be noted that the space between the collar 35 and the deposited solid 20 defined by the opening 36 will enable a partial reflux of the liquid 46 with the liquid melt 12 in the lower section 37 of the crucible 11.

As illustrated in FIG. 4, a different embodiment is provided for removing the solid 20 and shearing or cutting a portion of the outer extremity of the deposited solid material 20 from that portion which is to be removed. An annular holder means 50 is secured with the rotatable shaft 14 by any suitable means such as welding so that the holder means 50 rotates with the shaft 14. Depending therefrom is a rotatable annular blade 51 which is illustrated as shearing or cutting off a portion of the pure deposited solid material 20 at 52 as the solid 20 moves up the rotatable shaft 14. The portion 20a of the deposited solid material 20 will rise or move up the rotatable shaft 14 into the expanded portion 50 where a heating means 54 melts the solid 20a so that the melted solid 20a will drop into a stationary collector ring 55 to enable it to be removed from the collector ring 55 through a conduit means 56 as illustrated in the figure. The holder means 50 is provided with a plurality of perforations 50a along the bottom and side walls thereof for enabling the pure liquid melt to be centrifugally forced through the perforations 50a and into the ring 55 to thereafter be removed from the freeze refining apparatus 10. As further illustrated in the figure, there are provided inlet and outlet conduits 57 and 58 for enabling the liquid melt to be inserted into and removed from the crucible 11, respectively.

As illustrated in FIGS. 5 and 6, a multistage continuous refining unit generally designated at 60 is adapted for vertical operation. A container or tube 61 of a cylindrical configuration is provided with end covers 62 and 63 which are sealed with the tube 61 by any suitable means such as welding. The shaft 14 is mounted in the tube 60 and is secured at the lower end 62 thereof with by a bearing attachment 64 which enables the rotatable internally cooled shaft 14 to rotate, as brought out hereinabove. A sealing and bearing means 65 is secured with the upper end 63 of the tube 61 for enabling the rotatable shaft 14 to properly rotate, while at the same time, maintaining sealing engagement between the sealing and bearing attachment 65 and the upper end 63 of the tube 61. A plurality of heating elements 66 is positioned around the tube 61. As further illustrated in the figure, a plurality of collars 67 is secured with the inner surface of the tube 61 and is secured at right angles to the longitudinal length of the tube. Each of the collars 67 is provided with annular openings 68 for enabling deposited solid materials 20 to move upwardly in the tube 61 utilizing the tapered threads 30 as brought out hereinabove. It should be noted that the collars 67 divide the tube 61 into a plurality of sections or units beginning with a lowermost section 70 and ending with an uppermost section 75.

As further illustrated in FIG. 5, a plurality of baffles 76 is provided for preventing the liquid melt from forming a vortex in the tube 61 as the deposited solids are moved up the shaft 14. Thus, the baffles 76 serve to inhibit the flow of the liquid melt 12 in the tube 61.

In this embodiment, raw material liquid melt is introduced in the unit 60 at the inlet port 78, and the deposited solid material 20 moves up the shaft 14 using the threads 30 to be remelted and refined in each successive stage until reaching the uppermost stage or section 75 where it is finally remelted and withdrawn through outlet port 80. It is, of course, to be understood that the rotatable shaft 14 operates in essentially the same manner as the rotatable shaft disclosed in the embodiments of FIGS. 1, 2, 3, and 4 and is provided with suitable conduit means 16 as brought out hereinabove for communicating the coolant along the longitudinal path of the rotatable shaft 14. It should also be understood that the heating means 66 serves the function of melting the deposited solid material 20 off the rotatable shaft 14 at each of the stages as illustrated in FIGS. 5 and 6.

It is to be understood that while a vertical unit 60 has been illustrated, such unit could easily be adapted for a horizontal position.

What is claimed is:

1. Apparatus for obtaining pure solid materials from liquid melt containing impure and pure materials comprising:
    (a) a crucible for receiving the liquid melt containing pure and impure materials;
    (b) a rotatable, hollow, cylindrical shaft positioned in the crucible and partially immersed within the melt;
    (c) conduit means positioned in said shaft for circulating coolant in said rotating shaft wherein the pure materials in the liquid melt become deposited in solid crystalline form on the outer surface of said rotatable shaft;
    (d) heating means mounted with said crucible for maintaining the pure and impure materials in a liquid melt form; and
    (e) means for continuously removing said solids deposited on the outer surface of said rotatable shaft including means for striking a blow to a portion of said shaft extending out of said liquid melt and above said pure solid material deposited thereon wherein said blow causes said solid to move up said shaft and out of the crucible thereby effecting continuous removal of said solid pure material.

2. The structure as set forth in claim 1 including:
    (a) a crucible for receiving the liquid melt containing pure and impure materials;
    (b) a rotatable, hollow, cylindrical shaft positioned in the crucible and partially immersed within the melt;
    (c) conduit means positioned in said shaft for circulating coolant in said rotating shaft wherein the pure materials in the liquid melt become deposited in solid crystalline form on the outer surface of said rotatable shaft;
    (d) heating means mounted with said crucible for maintaining the pure and impure materials in a liquid melt form; and
    (e) means for continuous removal of said solid deposit on the outer surface of said rotatable shaft including a plurality of external threads positioned on the outer surface of said rotatable shaft whereby when said shaft is quickly accelerated it thereby causes the deposit of pure solid material to loosen and move up said shaft thereby effecting continuous removal of said pure solid material.

3. The structure as set forth in claim 1 including:
    (a) a crucible for receiving the liquid melt containing pure and impure materials;
    (b) a rotatable, hollow, cylindrical shaft positioned in the crucible and partially immersed within the melt;
    (c) conduit means positioned in said shaft for circulating coolant in said rotating shaft wherein the pure materials in the liquid melt become deposited in solid crystalline form on the outer surface of said rotatable shaft;
    (d) heating means mounted with said crucible for maintaining the pure and impure materials in a liquid melt form; and
    (e) means for continuous removal of said solid deposit on the outer surface of said rotatable shaft including a plurality of external threads positioned on the outer surface of said rotatable shaft wherein rapid deceleration of said shaft causes the deposited pure solid material to loosen and move up said shaft to thereby effect continuous removal of said pure solid material.

4. The structure as set forth in claim 1 including:
    (a) a crucible for receiving the liquid melt containing pure and impure materials;
    (b) a rotatable, hollow, cylindrical shaft positioned in the crucible and partially immersed within the melt;
    (c) conduit means positioned in said shaft for circulating coolant in said rotating shaft wherein the pure materials in the liquid melt become deposited in solid crystalline form on the outer surface of said rotatable shaft;
    (d) an annular collar having an opening about the center thereof secured with said crucible, said collar separating said crucible into an upper and lower section;
    (e) means with said collar extending into said lower section to limit the diameter of said deposited solid pure material;
    (f) heating means positioned in said upper section of said crucible for remelting the solid pure material deposited on said shaft as it is moved upwardly on said shaft;
    (g) conduit means positioned in said upper section of said crucible for removing said pure solid liquid melt; and
    (h) conduit means with said lower section of said crucible for introducing and removing unrefined liquid melt as desired.

5. The structure as set forth in claim 1 including:
    (a) a crucible for receiving the liquid melt containing pure and impure materials;
    (b) a rotatable, hollow, cylindrical shaft positioned in the crucible and partially immersed within the melt;
    (c) conduit means positioned in said shaft for circulating coolant in said rotating shaft wherein the pure materials in the liquid melt become deposited in solid crystalline form on the outer surface of said rotatable shaft; and (d) said rotatable hollow cylindrical shaft including a section for receiving deposited pure solids on the outer surface thereof and insulated sections positioned above and below said section for receiving the deposited pure solids wherein deposits of said pure material are prevented from becoming deposited on said insulated section of said rotatable shaft.

6. The structure as set forth in claim 1 including:
(a) a crucible for receiving the liquid melt containing pure and impure materials;
(b) a rotatable, hollow, cylindrical shaft positioned in the crucible and partially immersed within the melt;
(c) conduit means positioned in said shaft for circulating coolant in said rotating shaft wherein the pure materials in the liquid melt become deposited in solid crystalline form on the outer surface of said rotatable shaft;
(d) means for collecting the solid pure materials as it moves up said rotatable shaft; and
(e) heating means mounted adjacent said means for collecting to remelt said solid pure material to enable said pure material to be removed in liquid melt form.

7. The structure as set forth in claim 6 including shearing and cutting off the outer surface of said pure solid material as it moves up said rotatable shaft.

8. A unit for obtaining pure solid materials from a liquid melt containing pure and impure materials and for continuous removal of the pure solid materials comprising:
(a) a vertical hollow container for receiving the liquid melt;
(b) a plurality of annular collars each of which has aligned openings positioned inside said hollow container wherein said collars form sections in said container which communicate with each other through their aligned openings;
(c) a rotatable hollow cylindrical shaft extending through said container and through each of said aligned openings of each of said collars to communicate with the liquid melt in each of said sections;
(d) a conduit positioned in said shaft for enabling said shaft to become cooled relative to said liquid melt wherein pure solid material is deposited on said rotatable shaft in each of said sections;
(e) means for continuous removal of said pure solid material to a next succeeding upper section of said plurality of sections;
(f) a plurality of heating means mounted with said container, said heating means being positioned adjacent each of said sections wherein solid deposited on said rotatable shaft in said lowermost section will be moved upwardly by said means for continuous removal to the next adjacent of said sections and become remelted by said heating means until said solid material deposited on said shaft in said lowermost section reaches said uppermost section of said container in a pure solid material form to become remelted in said uppermost section; and
(g) conduit means for removing said remelted pure material from said uppermost section.

9. The structure as set forth in claim 8 including baffle means positioned longitudinally in said container for continuously agitating said liquid melt to prevent vortex formation therein.

References Cited
UNITED STATES PATENTS

| | | | |
|---|---|---|---|
| 1,594,390 | 8/1926 | Van Stone et al. | 62—346 X |
| 2,419,953 | 5/1947 | Knowles | 62—345 |
| 2,549,215 | 4/1951 | Mansted | 62—346 |
| 2,764,880 | 10/1956 | Wenzelberger | 62—58 |
| 2,900,804 | 8/1959 | Rising | 62—346 X |
| 2,995,016 | 8/1961 | Beattie et al. | 62—58 |
| 3,400,548 | 9/1968 | Drayer | 62—58 |
| 2,071,465 | 2/1937 | Huber | 62—354 |
| 2,639,594 | 5/1953 | Watt | 62—354 |
| 3,031,863 | 5/1962 | Corn | 62—353 |
| 3,287,927 | 11/1966 | Jacobus | 62—353 |

NORMAN YUDKOFF, Primary Examiner

R. T. FOSTER, Assistant Examiner

U.S. Cl. X.R.

62—58, 345, 353; 23—273; 75—68